United States Patent [19]

French et al.

[11] 4,051,885

[45] Oct. 4, 1977

[54] TIRE AND WHEEL ASSEMBLIES

[75] Inventors: Tom French; Reginald Harold Edwards, both of Sutton Coldfield; Leslie Vernon Powell, Lichfield, all of England

[73] Assignee: Dunlop Holdings Limited, London, England

[21] Appl. No.: 629,522

[22] Filed: Nov. 6, 1975

Related U.S. Application Data

[63] Continuation of Ser. No. 150,627, June 7, 1971, abandoned.

[30] Foreign Application Priority Data

June 20, 1970 United Kingdom ............... 30027/70

[51] Int. Cl.² ...................... B60C 17/00; B60C 17/04
[52] U.S. Cl. ................................ 152/330 L; 152/158; 152/330 RF

[58] Field of Search ............... 152/330 R, 352, 353 R, 152/330 RF, 330 L, 379 R, 158

[56]  References Cited

U.S. PATENT DOCUMENTS

| 2,987,093 | 6/1961 | Urbon | 152/330 L |
| 3,444,918 | 5/1969 | Goggins | 152/330 L |
| 3,610,308 | 10/1971 | McDonald | 152/330 L |
| 3,903,946 | 9/1975 | French et al. | 152/330 L |

Primary Examiner—Drayton E. Hoffman
Attorney, Agent, or Firm—Stevens, Davis, Miller & Mosher

[57] ABSTRACT

A pneumatic tire and wheel assembly containing an enclosing means for a lubricating material. The enclosing means will release the lubricating material into the tire when the tire becomes deflated.

16 Claims, 12 Drawing Figures

TIRE AND WHEEL ASSEMBLIES

This is a continuation of application Ser. No. 150,627 filed June 7, 1971 now abandoned.

This invention relates to tire and wheel assemblies.

Upon partial or complete deflation of a pneumatic tire mounted on a wheel during the running of a vehicle opposite surfaces in the interior of the tire and wheel assembly come into contact with one another under more or less load according to whether or not the deflation is complete; the regions of the interior surfaces which normally come into contact are the interior surfaces of the tire close to but radially outwardly of the rim flange and the interior surfaces of the tire close to but radially inwardly of the tread edge.

When the surfaces come into contact considerable heat is generated within the rubber and textile components of the tire and very rapid structural failure ensues. It has been discovered that the major source of the heat generated is caused by the relative movement of the surfaces in contact and under load and the temperature rise is particularly marked because of the high co-efficient of friction of dry rubber to dry rubber.

According to the present invention a pneumatic tire and wheel assembly comprises an enclosing means for a lubricating material for the interior surfaces of the tire said lubricating material being releasable from the enclosing means into the inflation chamber defined by the tire and wheel upon substantial loss of inflation pressure or deflation of the tire.

The enclosing means may be such as to release the lubricant into the inflation chamber by reason of loss of pressure in the tire impact or abrasion on the enclosing means or excessive temperature in the tire.

When the enclosing means is to release the lubricant on impact or abrasion it is preferred that it should be positioned in or adjacent to the regions of the interior surfaces of the tire which come into contact when the tire is deflated.

Thus the enclosing means may comprise a sachet or tube or similar container of material, e.g., plastics material, which can be opened or ruptured to cause release of lubricating liquid by impact or abrasion of the interior surface of the tire upon the sachet or tube in the event of substantial loss of inflation pressure or deflation.

The sachet(s) or tube(s) or an operative part(s) thereof may be located on the interior surface of the tire or on the interior surface of the rim, but is preferably positioned in or adjacent the lower sidewall region of the tire immediately radially outwardly of the rim flange or the region of the tire interior radially inwardly of the tread edge.

Alternatively the enclosing means may be a pressurizable container attached to the wheel, radially inwardly or radially outwardly of the rim. The lubricant may be released from such a container by means of a valve sensitive to loss of tire inflation pressure or by rupture of a suitable membrane.

In a further alternative the enclosing means may be an encapsulating resin or plastic which can be in the form of small particles each enclosing a small portion of lubricant or can be in the form of a foam in which the lubricant is trapped.

A saddle, i.e., a raised member separate or forming part of the rim and located between the rim flanges and tire heads may be provided, the saddle extending into a radially outward position from the rim base to be disposed so that the enclosing means or an operative part thereof can be opened or ruptured on the one hand by contact between the interior surface of the deflected portion of a tire and the enclosing means carried on the saddle or on the other hand, by contact between the saddle and container when carried on the interior surface of the tire.

The enclosing means may comprise a container with screwed-on cap adapted gradually to be unscrewed step-by-step by rubbing contact with the interior surface of the tire and wheel assembly during rotation of a partly deflated or deflated tire as the cap passes through the ground-to-tire contact patch.

Alternatively the container cap or a projection from the cap may be subject to rupturing by impact or abrasion to cause release of container contents, or the cap or projection can be of a material subject to fatigue failure to release the container contents after several cycles of deflection, e.g., about 100 cycles of deflection, the deflection being caused by intermittent contact with a part or parts of the interior surfaces of the tire and wheel assembly.

In the pneumatic tire and wheel assembly of this invention, the tire preferably has a tread width which is greater than the width between flanges of the rim. Similarly the tire preferably has a relatively low aspect ratio, e.g., between 30 and 75% and preferably between 55 and 70%.

It is desirable that the tire should remain securely on the rim when deflated so that the wheel rim may be a flat base rim, i.e., a rim without a well such as a rim in which the well has been closed by axial compression, or a split rim, and/or bead retaining means may be provided to maintain the at least the laterally outer bead in position. If desired the bead retaining means may be combined with an enclosing means for lubricating material, e.g., the bead retaining means may consist of a lubricant container of a width which fits closely between the tire beads.

A number of examples of the invention will now be described by way of example only with reference to the accompanying drawings in which FIG. 1 is a sectional view of a tire mounted on a wheel rim, a band being provided inside the tire tread which band carries containers for lubricant;

Figure 1:
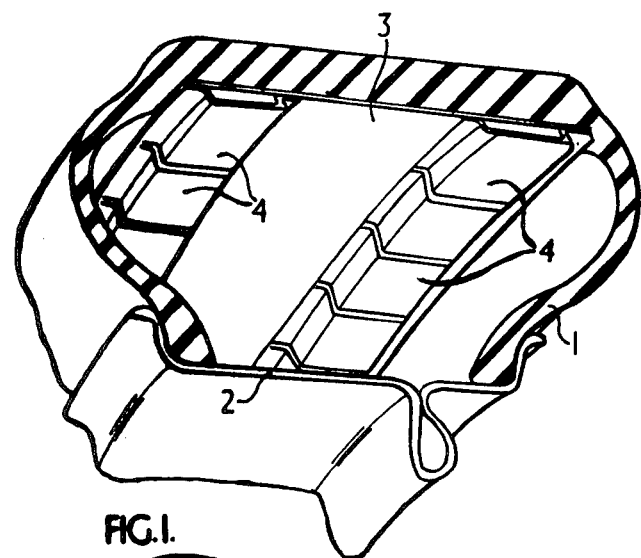

In the example shown in FIG. 1 a tire 1 is mounted on a flat-base axially compressed wheel rim 2. Inside the tread region of the tire is positioned a band 3 carrying lubricant containers 4 which are located above the beads of the tire so that if the tire deflates the lubricant containers 4 will be trapped between the contacting internal surfaces of the tire and the lubricant therein released. The band 3 may be made of, e.g., ABS or an ABS/PVC blend and can be, e.g., ¼ mm thick. The lubricant containers may be made of plastics material, e.g., PVC or of thin soft rubber.

The lubricant containers illustrated in FIG. 1 are confined to the edges of the ring 3 but, if desired, the containers may take the form of ribs extending across the whole width of the band.

Figure 2:
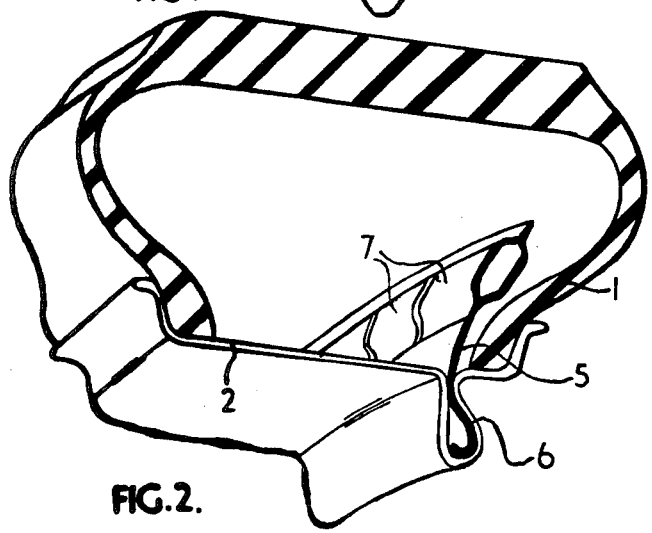
FIG. 2 is a similar view in which the tire contains a ring which is trapped in the rim and carries containers for lubricant.

In the example shown in FIG. 2 a resilient but stiff annular ring 5 is trapped by its radially inner edge in the crimp 6 of the axially compressed wheel rim. The ring 5 carries a series of lubricant containers 7 which are held into the interior of the tire 1 against the lower sidewall where they will be trapped and burst if the tire deflates.

In an alternative arrangement (not shown) to that shown in FIG. 2 the ring 5 may be U-shaped in section, instead of being annular and trapped in the rim. Two sets of lubricant containers can then be provided, one on each arm of the U so that there is a set of containers against both sidewalls of the tire.

Figure 3:
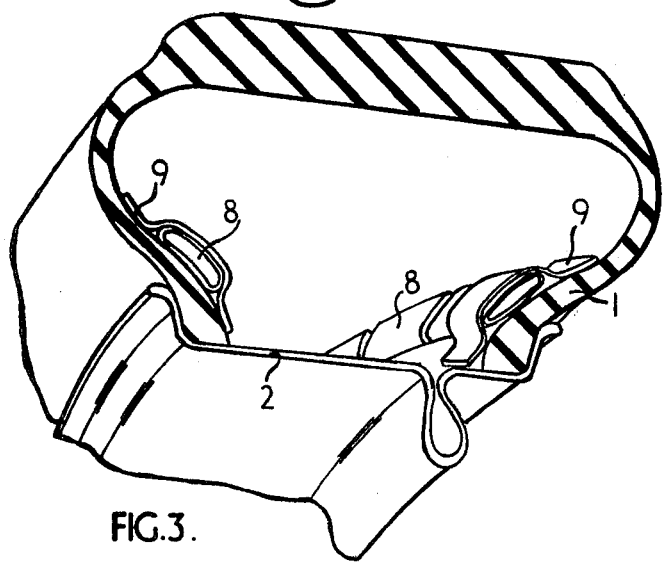
FIG. 3 is a similar view in which the tire contains containers for lubricant which are arranged on the inner sidewall of the tire.

In the example shown in FIG. 3 strings of lubricant containers 8 are held against the lower sidewalls of the tire by means of adhesive strips 9 in a position where they will be trapped and burst if the tire is run in a deflated condition.

Figure 4:
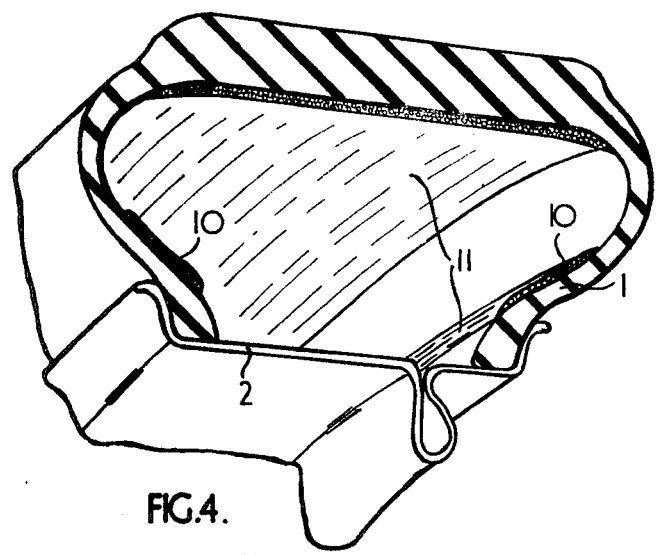
FIG. 4 is a similar view in which the tire has layers of encapsulated lubricant adhered thereto.

In the example shown in FIG. 4 the lubricant is retained within small containers 10 of encapsulating material, a layer 11 of these small capsules being adhered to suitable regions of the inside of the tire cover, e.g., the crown or lower sidewall regions. The encapsulating material may be, e.g., a modified polyester resin as described below.

Figure 5:
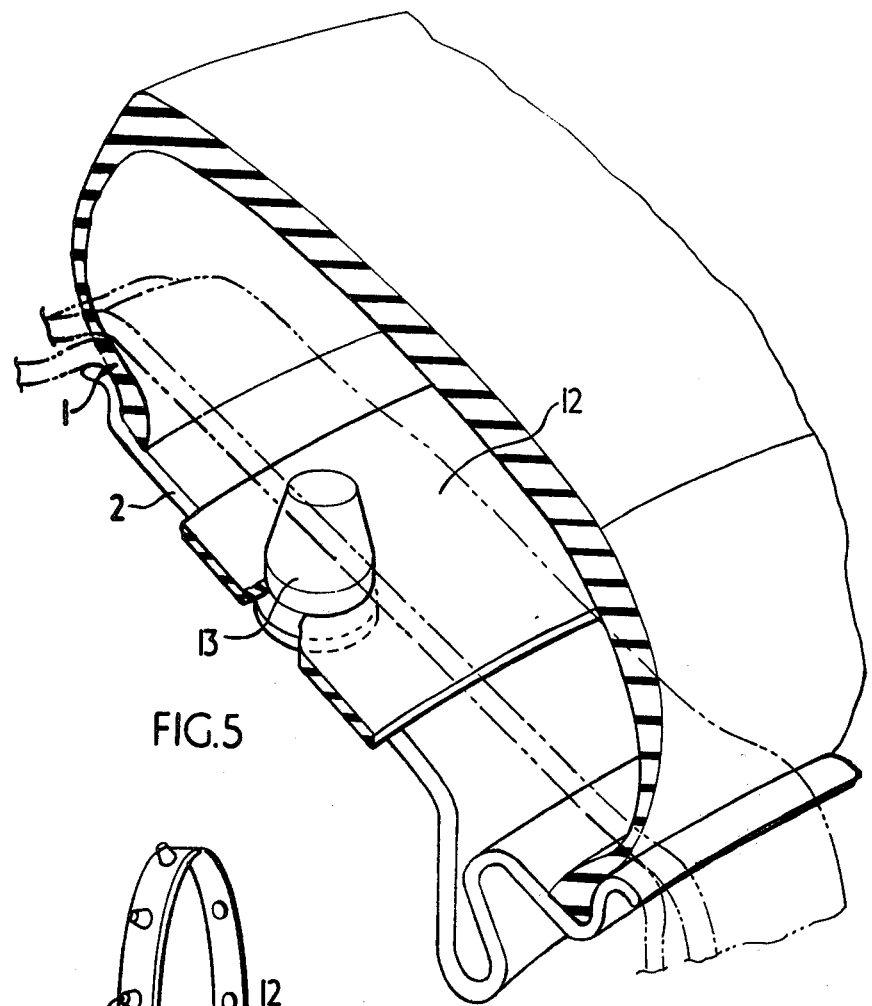
FIG. 5 is a similar view in which there is mounted on the rim a resilient ring carrying, at spaced intervals, suitably shaped projections of resin foam containing lubricant trapped therein.

In the example shown in FIG. 5 a resilient retaining band 12 is positioned on the rim the band holding at spaced intervals suitably shaped mouldings 13 of a rigid foam-like structure which contains encapsulated lubricant. The mouldings 13 are of a size and shape to cause them to be broken away and crushed if the tire is run in a deflated condition.

The mouldings 13 may, for example, be made by intimately mixing 100 parts by weight of a suitably modified polyester resin with 300 parts of a lubricating fluid and adding a peroxide catalyst to rapidly cross-link the polyester. The resultant material consists of fine globular particles of lubricant retained in a matrix of polyester.

Figure 6:
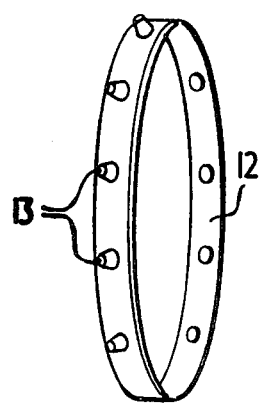
FIG. 6 is a perspective view of the resilient ring of FIG. 5.

The retaining band 12 with a plurality of mouldings 13 in position is shown in FIG. 6.

In an alternative arrangement to that shown in FIGS. 5 and 6 the retaining band may be an extrusion suitably shaped to be trapped by the crimp in the axially compressed rim, the extrusion, for example, engaging slots in the mouldings of the rigid foam-like structure.

In a further alternative arrangement to that shown in FIGS. 5 and 6 the mouldings 13 may be replaced by rigid thin-shell vacuum formed plastics vessels. These vessels may have a preformed fracture line and will be positioned where they are broken by the tire if it is run in a deflated condition.

Figure 7:
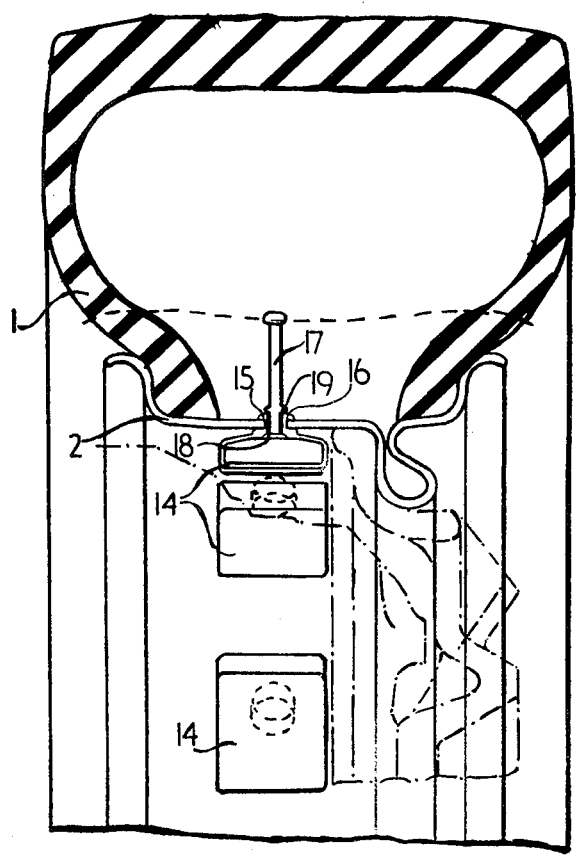
FIG. 7 is a sectional view of a tire and rim in which a container for lubricant is provided radially inwardly of the rim.

In the example shown in FIG. 7 a plurality of lubricant containers 14 are positioned on the radially inner side of the rim. The containers communicate with the inflation chamber of the tire by means of a hole 15 in the rim in which a neck 16 on the container 14 fits in sealing engagement. The neck 16 of the chamber is sealed by a plunger 17 whose radially inner end has a tapered flange 18 to seal with a seating on the container neck. The plunger also has a small projecting ring 19 positioned immediately radially outwardly of the container neck 16.

In this case on running of the tire in a deflated state the plunger 17 is forced into the neck 16, and the ring 19 passes through the neck preventing resealing by the plunger.

In an alternative arrangement containers may be arranged around the rim as in FIG. 7 but can be sealed from the tire inflation chamber by breakable diaphragms. Similarly the lubricant containers may be pressurized.

Figure 8:
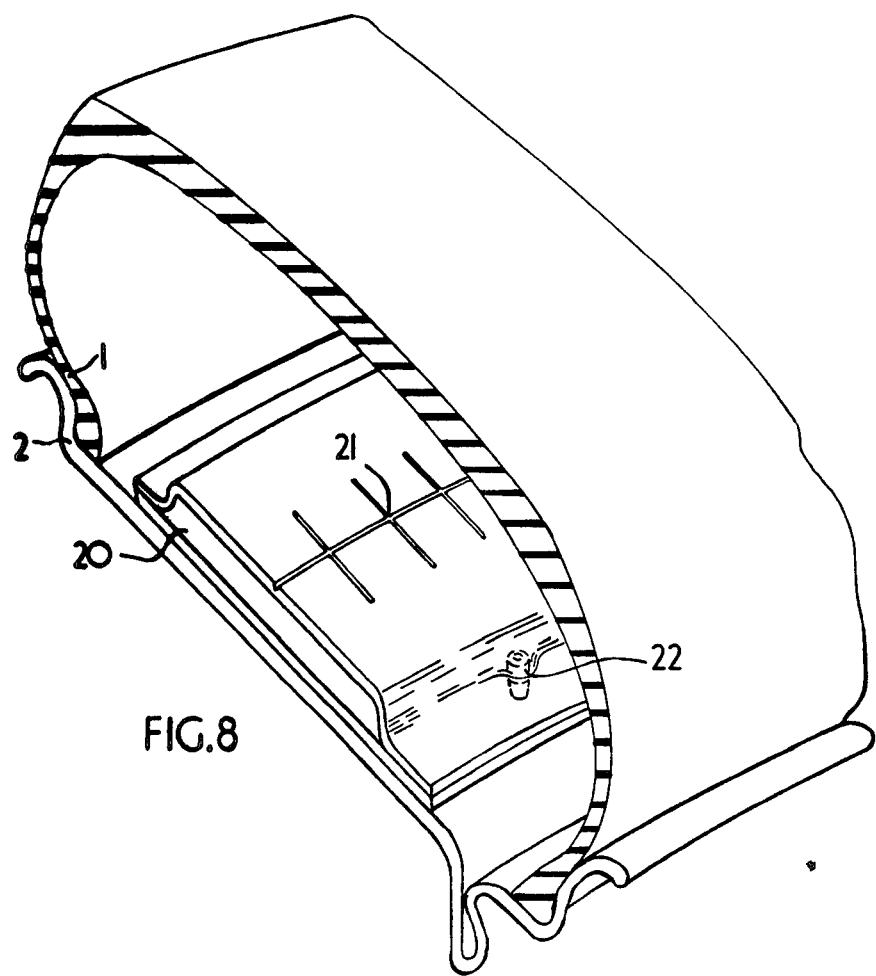
FIG. 8 is a similar view in which a pressure rupturable tube is provided on the rim.

In the example shown in FIG. 8 a sealed container 20 is located and, if necessary, adhered to the base of the rim within the tire. The container 20 may be a complete toroid or may be a segment thereof, and is conveniently made of a plastics material such as flexible PVC film.

In the upper face of the container 20 are incorporated a series of weak zones 21 which will rupture at a predetermined strain. A valve 22 is provided for injection of air into the container 20.

The container 20 is fitted and completely filled with lubricating fluid and after the tire has been inflated a calculated quantity of air is injected into the container 20. The quantity of air injected into the container 20 is sufficient that if the tire deflates to below a predetermined pressure, e.g., below 20% of normal inflation pressure, the container 20 will be expanded to an extent which will cause its rupture. If it is desired to deflate the tire for some purpose rupture of the container 20 can be prevented by opening the valve 22.

Figure 9:
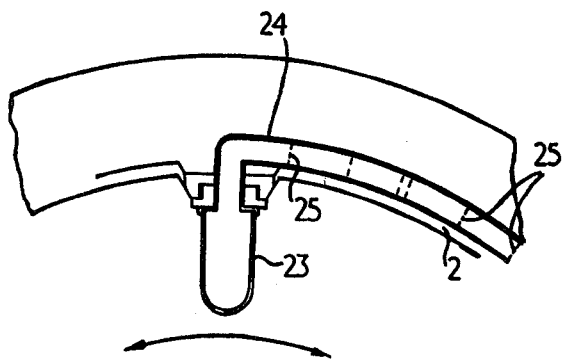
FIG. 9 is a diagrammatic sectional side view of a tire and wheel rim in which a pressurizable lubricant container is mounted radially inwardly of the rim and a tube containing rupturable diaphragms extends into the tire interior.

In the example shown in FIG. 9 a lubricant container 23 is provided on the radially inward side of the rim having a flexible tube 24 attached thereto and extending into the interior of the tire inflation chamber. The tube 24 is held along the rim in a position where it will be compressed when the tire is flattened. The tube 24 contains a number of breakable bulkheads 25 of, e.g., plastics material which will break in turn to release the lubricant if the tire is run in a deflated condition. A single impact, however, will not be sufficient to break all the bulkheads and release the lubricant.

In an alternative arrangement to that shown in FIG. 9 the container is provided with tubes similar to the tube 24 extending in both directions along the rim and in a further alternative the container is positioned in a well in the rim.

Figure 10:
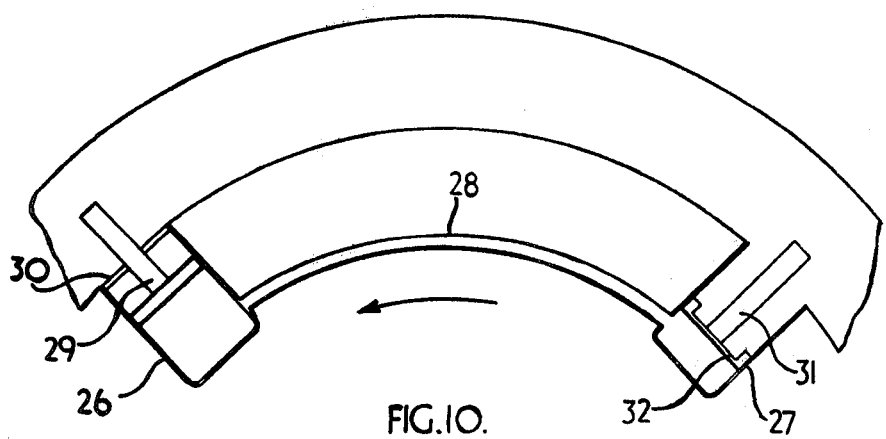
FIG. 10 is a similar view in which a pair of containers are mounted inside the rim and linked together.

In the example shown in FIG. 10 a number of pairs of cylinders 26 and 27 are positioned in the rim of the wheel. The cylinders 26 and 27 are linked by a passage 28 containing liquid lubricant the cylinder 26 containing a plunger 29 and diaphragm spring 30 and the cylinder 27 containing a plunger 31 incorporating a rupturable diaphragm 32. When the plunger 29 is struck by the tire the plunger 31 is raised and when the plunger 31 is struck by the tire the diaphragm 32 is ruptured releasing the lubricant. If, after the plunger 29 is struck, the plunger 31 is not struck, as in the case of a single impact the plungers return to their original positions under the influence of the diaphragm spring 30. In this position the plunger 31 cannot be struck by the tire.

Figure 11:
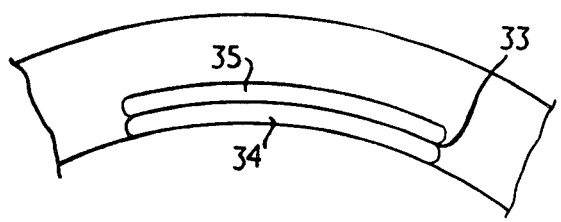
FIG. 11 is a similar view in which an inner air bag and separate lubricant container are located inside the tire and FIG. 12 is a sectional view of a tire on a wheel rim in which lubricant sachets are mounted on a saddle support.

In the example shown in FIG. 11 a two part moulded bladder 33 is positioned on the radially outer face of the rim. In the inner part 34 of the bladder is compressed air and in the outer part 35 of the bladder is a lubricant. Under normal conditions the compressed air in the part 34 does not distend the bladder owing to the opposing tire pressure but if the tire is deflated the bladder 33 is distended so that the outer part 35 becomes subject to the mechanical action of the tire. The combined effects of distention and the contact with the tire rupture the outer part 35 of the bladder releasing the lubricant.

In an alternative arrangement (not shown) the two part bladder may extend circumferentially around the rim, functioning in a similar manner to the bladder illustrated.

Figure 12:
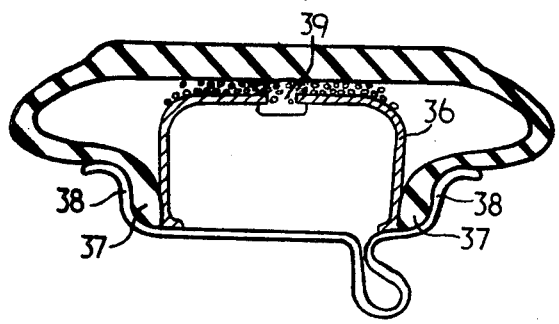

In the example shown in FIG. 12 a saddle support 36 is positioned inside the tire and rim assembly the saddle serving to hold the beads 37 of the tire against the rim flanges 38 and to hold a burstable sachet or tube of lubricant 39 in a position where the tire, when flattened (as shown) burst the sachet 39, releasing the lubricant.

It will be appreciated that in many of the examples described above using a lubricant container a suitably shaped moulding of foamed resin of the tire described with particular reference to FIG. 5 could be used.

An advantage of the embodiments of the invention which relate to an enclosing means capable of releasing its contents only after a full revolution or number of revolutions of the flattened tire as opposed to the enclosing means immediately releasing the lubricant on a single impact is that release of contents do not take place prematurely due to a single or a few isolated severe deflections of a fully inflated tire.

The lubricant within the enclosing means may be of liquid form, as described in the assignee's U.S. Pat. Nos. 3,739,829 and Re. 28,587.

However, the lubricant may in some cases be of solid form, e.g., powdered graphite or French Chalk.

The invention applies to tire and wheel assemblies in which the tire can be removed from the rim, e.g., when the rim is a split rim, or alternatively, when the tire is not removable therefrom, i.e., the two form a permanent assembly, for example, when the rim is swaged over the tire beads after assembly of tire and rim.

The present invention may be used in conjunction with the inventions of the assignee's U.S. Pat. Nos. 3,814,161 and 3,930,527 and U.S. application Ser. Nos. 150,561 (not abandoned) and 150,562 (now abandoned), both filed June 7, 1971.

It will be appreciated that in many of the examples described above using individual containers or other enclosing means for lubricant it is necessary to ensure an even weight distribution about the wheel to avoid unbalance. This is preferably done by distributing two or more containers in suitable positions on the wheel to ensure balance.

Having now described our invention, what we claim is:

1. A pneumatic tire having a tread area and a pair of sidewalls defining an interior surface, each sidewall having an annular bead and having attached to but separate from its interior surface a closed enclosing means extending around the circumference of the tire in a position opposite said beads and containing a lubricant for the interior surfaces of the tire, means for releasing said lubricant from said enclosing means onto the interior surfaces of the tire which contact each other upon substantial under-inflation or deflation of the tire to facilitate relative movement between the contacting interior surfaces of the tire.

2. A pneumatic tire according to claim 1 in which the enclosing means is positioned on the interior surface of the tire radially inwardly of the tread edge.

3. A pneumatic tire according to claim 1 in which the enclosing means is an encapsulating material in the form of small particles which enclose a small portion of the lubricant.

4. A pneumatic tire according to claim 3 in which the encapsulating material is a resin.

5. A pneumatic tire according to claim 3 in which the encapsulating material is a plastic.

6. A pneumatic tire and wheel assembly capable of being run in a deflated condition comprising:
   a. a tire and a wheel upon which the tire is mounted to define therewith an inflation chamber, said wheel having a rim with a pair of opposed annular flanges and means for preventing the tire from becoming dislodged from the wheel when being run deflated and
   b. a closed enclosing means extending around the circumference of the inflation chamber in a position opposite said flanges and attached to but separate from the interior surface of the tire, containing lubricating material for the interior surfaces of the tire, which enclosing means releases the lubricating material onto the interior surfaces of the tire which contact each other when the assembly is used with the tire in a deflated condition to facilitate relative movement between the contacting interior surfaces of the tire.

7. A tire and wheel assembly according to claim 6 including means to release the lubricating material from the enclosing means when the pressure in the inflation chamber falls below a predetermined value.

8. A tire and wheel assembly according to claim 6 including means to release the lubricating material from the enclosing means when the temperature in the inflation chamber exceeds a predetermined value.

9. A tire and wheel assembly according to claim 6 in which the enclosing means comprises a sachet.

10. A tire and wheel assembly according to claim 6 in which the enclosing means comprising a plurality of lubricant containers mounted on an annular band disposed in the inflation chamber.

11. A tire and wheel assembly according to claim 6 in which the tire has a tread width which is greater than the width of the rim between the flanges thereon.

12. A tire and wheel assembly according to claim 6 in which the tire has an aspect ratio of between 30 and 75%.

13. A tire and wheel assembly according to claim 12 in which the tire has an aspect ratio of between 55 and 70%.

14. A tire and wheel assembly according to claim 9 in which the wheel rim is a rim without a well.

15. A tire and wheel assembly according to claim 9 in which the means for preventing the tire from becoming dislodged from the wheel when being run deflated comprises a retaining member for maintaining at least the laterally outer bead of the tire in position against the flange of the wheel.

16. A pneumatic tire and wheel assembly capable of being run in a deflated condition comprising:
   a. a tire and wheel upon which the tire is mounted to define therewith an inflation chamber, said wheel having a rim with a pair of opposed annular flanges and means for preventing the tire from becoming dislodged from the wheel when being run deflated,
   b. the entire interior surface of the tire and the inflation chamber being free of intermediate supporting structure so that when the assembly is run deflated, opposed internal surfaces of the tire come into contact, and
   c. a closed enclosing means extending around the circumference of the inflation chamber in a position opposite said flanges and attached to but separate from the interior surface of the tire, containing lubricating material for the interior surfaces of the tire, which enclosing means releases the lubricating material onto the contacting interior surfaces of the tire in response to impact or abrasion when the assembly is used with the tire in a deflated condition to facilitate relative movement between the contacting interior surfaces of the tire.

* * * * *